W. E. BORST.
Wire Bale-Tie.

No. 200,371. Patented Feb. 19, 1878.

Witnesses;
John Milhauay
Lewis D. Holmes

Inventor;
William E. Borst

UNITED STATES PATENT OFFICE.

WILLIAM E. BORST, OF COBLESKILL, NEW YORK, ASSIGNOR TO GUSTUS S. FRANCE, OF WORCESTER; SAID G. S. FRANCE ASSIGNOR TO WASHBURN & MOEN MANUFACTURING COMPANY, OF SAID WORCESTER, MASS.

IMPROVEMENT IN WIRE BALE-TIES.

Specification forming part of Letters Patent No. 200,371, dated February 19, 1878; application filed November 17, 1876.

*To all whom it may concern:*

Be it known that I, WILLIAM E. BORST, of Cobleskill, in the county of Schoharie and State of New York, have invented certain new and useful Improvements in Bale-Ties; and I do hereby declare that the following is a full, clear, and exact description of the same, reference being had to the accompanying drawings, forming a part of this specification, and in which—

Figure 1:
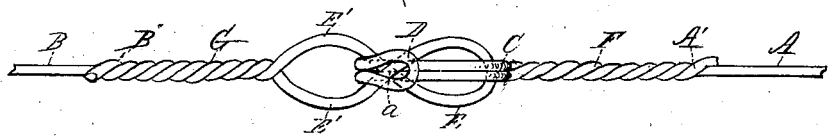
Figure 2:
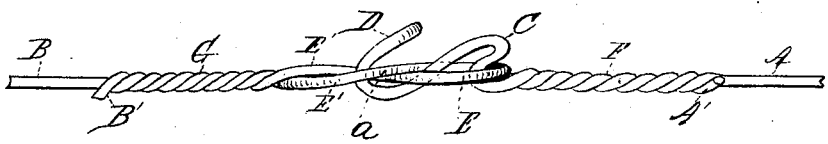

Figure 1 represents a top or plan view of so much of a bale-tie as is necessary to illustrate my present invention, and Fig. 2 represents a side view of the parts shown in Fig. 1.

To enable those skilled in the art to which my invention belongs to make and use the same, I will proceed to describe it more in detail.

In the drawings, the part marked A represents the main part of one end of the wire, having an extension, A', which is bent to form the two hooks C D and the twisted portion F, the end A' being returned and twisted upon the main part A.

The main part B of the other end of the bale-tie is extended and bent to form two loops, E and E', the wire forming the sides of the loops being crossed or partially braided or twisted, as shown at *a* in the drawings. The end B' is returned and twisted around the main wire B, as shown at G.

The arrangement is such that both hooks and both loops are brought into action when the tie is hooked about the bale and in the positions shown in the drawings.

Having described my improvements in bale-ties, what I claim therein as new and of my invention, and desire to secure by Letters Patent, is—

1. A wire bale-tie provided with two hooks at one end, substantially as shown and described.

2. In a wire bale-tie, the combination of two hooks at one end with two loops at the other, substantially as shown and set forth.

3. A wire bale-tie having the loop at one end divided by a twist, so as to form two loops, and two hooks at the other end, bent in the bight of the wire doubled upon itself, substantially as shown and set forth.

WILLIAM E. BORST.

Witnesses:
LEWIS C. HOLMES,
JOHN NETHAWAY.